United States Patent

[11] 3,572,527

| [72] | Inventor | Lee D. Butler |
| | | Kingsburg, Calif. |
| [21] | Appl. No. | 828,887 |
| [22] | Filed | May 29, 1969 |
| [45] | Patented | Mar. 30, 1971 |
| [73] | Assignee | Sperry Rand Corporation |
| | | New Holland, Pa. |

[54] PIVOTAL BALE SHOE FOR A BALE WAGON BALE LOADER
2 Claims, 6 Drawing Figs.

[52] U.S. Cl. .................................................. 214/83.14,
 214/519, 198/7BL
[51] Int. Cl. ................................................... B60p 1/36
[50] Field of Search ........................................... 214/83.14,
 83.26, 83.36, 519, 522, 6 (B); 198/7 (BL), 160

[56] References Cited
UNITED STATES PATENTS

| 2,372,902 | 4/1945 | Lewis .......................... | (198/7BL) |
| 3,414,139 | 12/1968 | Strommen .................... | 214/6(B) |

FOREIGN PATENTS

| 651,099 | 3/1951 | Great Britain ................ | 198/7BL |
| 1,014,124 | 12/1965 | Great Britain ................ | 198/7BL |

*Primary Examiner*—Albert J. Makay
*Attorneys*—Joseph A. Brown, John C. Thompson, James J. Kennedy and George C. Bower ABSTRACT: A bale loader, for use on an automatic bale-handling wagon, having a pivotally mounted bale shoe thereon adapted to engage a bale of crop material and positively force the bale rearwardly against a lifting means to facilitate elevating the bale from a field and transferring it to the wagon.

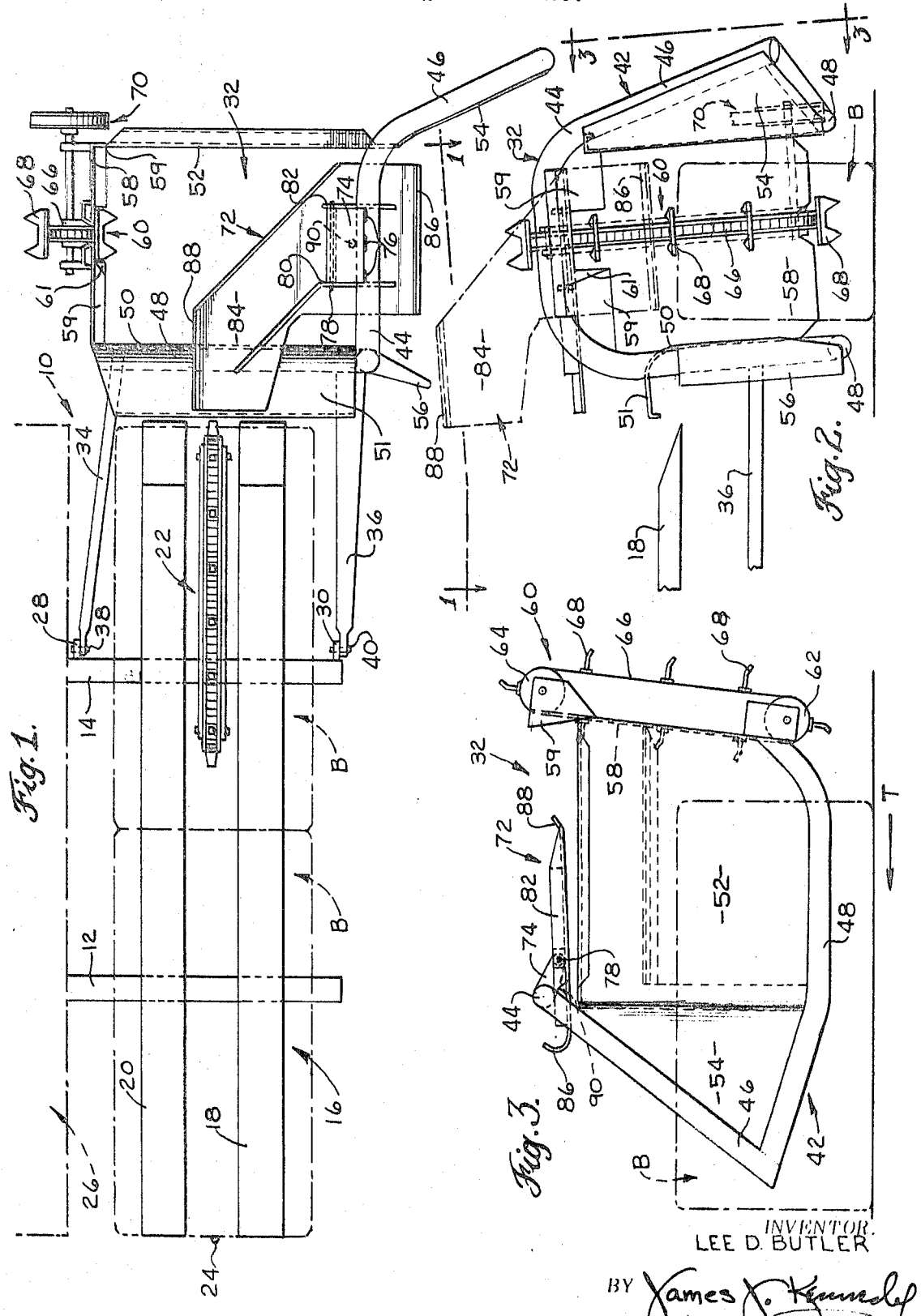

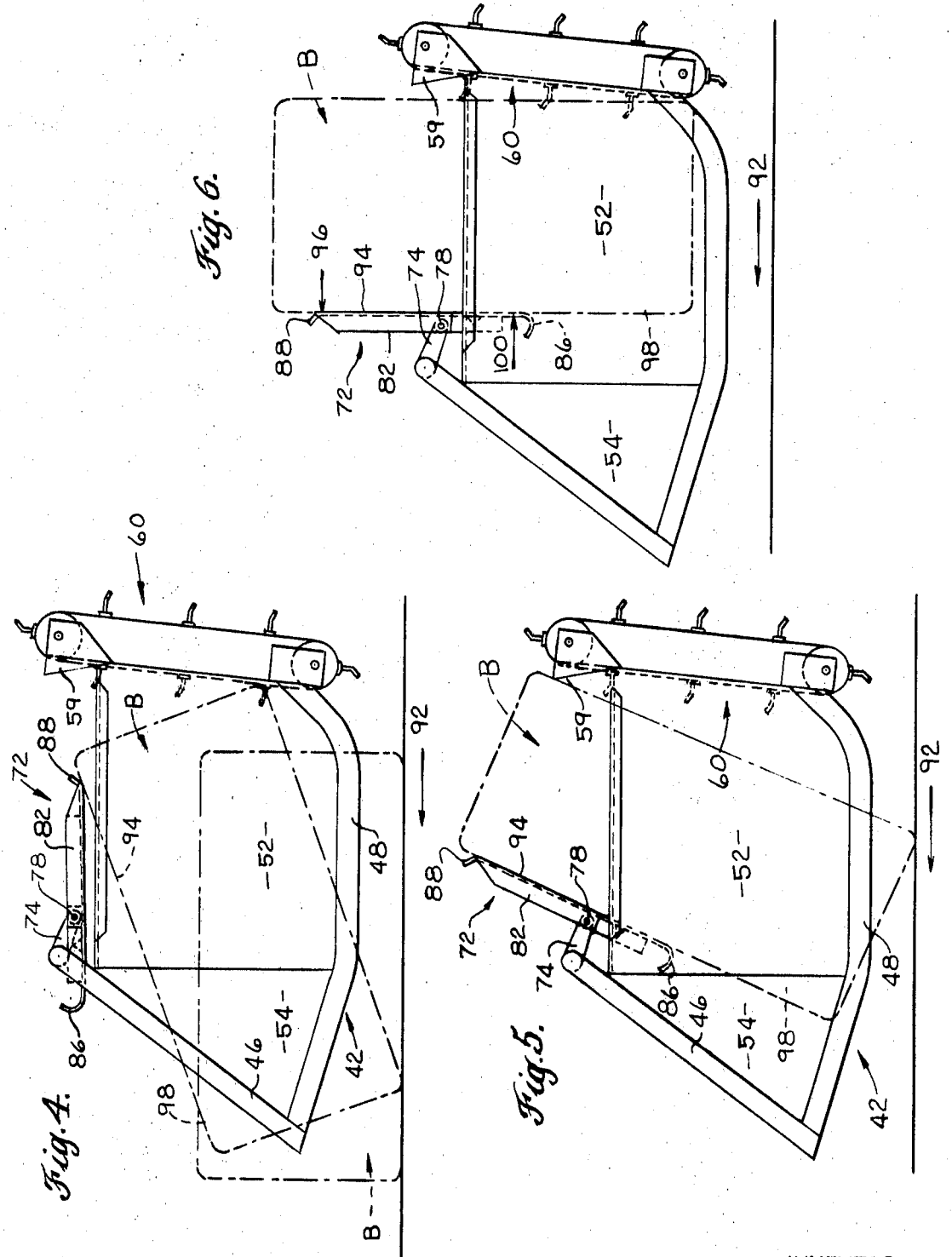

3,572,527

PIVOTAL BALE SHOE FOR A BALE WAGON BALE LOADER

BACKGROUND OF THE INVENTION

This invention relates generally to automatic bale wagon apparatus, and specifically to the pickup, or bale loader, apparatus forming an integral operable part of a bale wagon and adapted to lift bales from the ground and deliver them to the wagon as the wagon moves across the field.

An automatic bale-handling wagon, of the type shown and described by U.S. Pat. No. 2,848,127 issued by Grey on Aug. 19, 1958, includes as a necessary part thereof a bale pickup device. Since the initial introduction of the Grey-type wagon, the wagon has been refined and modified to make it a more efficient and effective machine. One such modification is shown and described in U.S. Pat. application Ser. No. 755,141, filed Aug. 28, 1968. Each of these completely automatic bale-handling wagons use bale pickup means as an integral component thereof and these pickup devices have also been refined and modified after years of continued use to provide a most effective means for lifting bales from the ground and transferring them to the wagon.

Such a refined pickup device has been shown and described in U.S. Pat. No. 3,367,522, issued to Grey et al. on Feb. 6, 1968. While the previously available pickup means have been effective and suitable for the task to be performed, they have had certain drawbacks inasmuch as difficulties have been experienced in keeping the lifted bale against the lifting means so that it is elevated smoothly and rapidly from the ground and deposited on the bale wagon. Previously, bales were guided into the forwardly opened portion of the pickup apparatus and into engagement with a rearwardly disposed, vertical conveying device. As the bales were lifted from the ground they were pivoted upwardly between the conveyor and a stationary bale shoe which guided the vertical movement of the bale so that it was properly aligned for placement on the receiving bed on the wagon. Because the previous bale shoes were fixed to the pickup means and were stationary with respect thereto, they were not always effective in keeping the lifted, variable sized bales tightly against the vertical conveyor. In such cases, the bales were not uniformly placed on the receiving table either because they had a tendency to twist as they were being lifted, or because they began to slip relative to the vertical conveying device. This problem was further compounded when the next bale in the field was encountered by the pickup before the previous bale had been transferred from the pickup onto the receiving table.

SUMMARY OF THE INVENTION

Accordingly, then the principle object of this invention is to provide a bale shoe which will positively force a lifted bale against the elevating means during the entire lifting operation so that it is swiftly and smoothly lifted from the ground and deposited in a uniform manner on the bale wagon-receiving table.

Another object of this invention is to provide a bale shoe which is pivotally mounted with respect to the pickup apparatus and is movable upon engagement with a bale to force the bale against the vertical conveying means.

Still another object of this invention is to provide a pivotal bale shoe which mounted forwardly on the pickup means and which is normally disposed on a horizontal position when not in engagement with a bale of crop material.

A further object of this invention is to provide a bale which is pivotally mounted adjacent its center and is movable between a generally horizontal position and a vertical position when in engagement with a bale being lifted from the ground.

These and other objects of the invention will become apparent from the following description and from the appended claims.

BRIEF DESCRIPTION OF THE DRAWINGS

FIG. 1 is a plan view of a bale loader for a bale wagon illustrating a pivoting bale shoe constructed in accordance with the invention, the view being taken as indicated by the lines 1-1 in FIG. 2;

FIG. 2 is a front view of the bale loader;

FIG. 3 is a side view of the bale loader taken as illustrated by the lines 3-3 in FIG. 2; and FIGS. 4, 5 and 6 are side views illustrating diagrammatically the progress of a bale being lifted from the ground and transferred to the bale wagon by the bale-loading device.

DESCRIPTION OF THE PREFERRED EMBODIMENT

Referring now specifically to the drawings, it will be seen that the forward portion of a bale wagon, illustrating generally by the numeral 10 in FIG. 1, is comprised of longitudinal frame members 12 and 14 receiving table 16, having transversely extending rails 18 and 20, conveyor 22, trip lever 24, and a transfer table 26. As those skilled in the art will readily understand, bales are first placed on receiving table 16 until trip lever 24 is contacted by the outermost bale causing the table to pivot upwardly with respect to the wagon frame portion and deposit the load of bales at the forward edge of the transfer table 26. This operation is more fully described in U.S. Pat. No. 2,848,127.

A pair of spaced-apart lugs 28 and 30 are fixed to and extend outwardly from longitudinal frame member 14, as shown in FIG. 1. A bale pickup, or loading apparatus, generally indicated by numeral 32, is pivotally mounted on bale wagon by means of mounting arms 34 and 36 which are connected to lugs 28 and 30 by pivot pins 38 and 40.

Pickup apparatus 32 is comprised of a generally U-shaped, forwardly opening frame structure 42 having a forward U-shaped bar portion 44, a forwardly extending bar portion 46 and rearwardly extending bar portions 48. A pair of laterally spaced-apart sideplates 50 and 52 are mounted on frame structure 42, with inner sideplate 50 having an inwardly bent top portion 51. Guide plates 54 and 56 extend forwardly from frame structure 42 and are fixed to the forwardly extending bar portion 46 and the U-shaped bar portion 44, respectively. As can be seen in FIGS. 1—3, a rear wall 58 is also mounted on frame structure 42 and extends between sideplates 50 and 52. A bale-elevating means 60 is vertically disposed in rear wall 58. A pair of spaced-apart wedgelike surfaces 59 are fixed to the rear wall on either side of elevating means 60 to permit the elevating means to separate from engagement with the bales as they are lifted upwardly in the pickup. The surface 61 insures that the bales will turn inwardly toward the receiving table.

The bale-elevating means is comprised of a drive pulley 62, driven pulley 64, endless chain 66 and bale-engaging lugs 68. A suitable driving connection 70 receives power by means not shown from the wagon and directs it to the bale-elevating means. While in this instance, the drive connection has been shown to be a belt-driven pulley and connecting shaft, a hydraulic motor may also be used to drive the conveyor chain.

A bale shoe shown generally by the numeral 72, is pivotally mounted at the forward end of frame structure 42 by means of a bracket 74, fixed to the U-shaped bar portion 44 by a plurality of welds 76, and a pivot pin 78 extending through a pair of spaced-apart ribs 80 and 82 which are formed on shoe 72. The shoe 72 is comprised of a flat portion 84, a forwardly disposed rounded edge portion 86 and a rearwardly disposed, upwardly flared end portion 88. A stop 90 is mounted on the upper surface of shoe 72 and is engageable with bracket 74 to limit the pivotal movement of the shoe with respect to the frame structure. As can be seen in FIG. 3, pivot pin 78 is transversely disposed with respect to shoe 72 and is disposed adjacent the center of the shoe. The shoe is so weighted that it will normally rest in a substantially horizontal position with stop 90 of the shoe-engaging bracket 74. It will also be understood by those skilled in the art, that the shoe may also be spring loaded, rather than weighted, so that it will always return to the near horizontal position after a bale has cleared the upper edge of the shoe.

In operation, the bale wagon 10 is propelled forwardly over a field which is strewn with hay bales B, the direction of travel being generally indicated by the arrow T of FIG. 3. In this position, the bale shoe 72 is disposed in its normal horizontal position and is guided into the forwardly open frame portion 42 of the pickup 32 by means of the forwardly extending guide plates 54 and 56 as can be seen in FIGS. 2—6 of the drawings. As the bale wagon continues to move in the direction of arrow 92 shown in FIGS. 4, 5 and 6, stationary bale B is engaged by rear wall 58 and vertical conveyor 60 of the pickup apparatus. The moving conveyor chain 66 causes one of its lugs 68 to engage the lower corner of the bale and cause it to be lifted upwardly into engagement with bale shoe 72, as shown in FIG. 4. Continued forward motion of the bale wagon causes the bale to be lifted to a near vertical position, as shown in FIG. 5 in which the bottom surface of the pivotal bale shoe 84 engages the upper portion 94 of the bale B forcing the bale to stay in engagement with the conveyor chain. As can be seen by FIG. 6, further continued forward motion of the bale wagon and pickup, results in the bale assuming a nearly vertical position so that the pivotal bale shoe is also forced to a near vertical position with its bottom surface in engagement with the bale. Continued elevation of the bale tends to drive the bale against the top of the bale shoe which in turn causes the bale shoe to apply more force against the lower section 98 of the bale, insuring positive engagement of the bale and the lifting chain until the bale has been elevated beyond the lifting chain. The force applied by the lifting bale to the upper portion of the bale shoe is shown by the arrow 96 in FIG. 6, with the resultant increased force being applied to the lower portion 98 of the bale in the direction shown by arrow 100 in FIG. 6. As the bale is lifted by the pickup apparatus, it is caused to fall over onto the receiving table 16 where it is engaged by cross conveyor 22. Once the bale has cleared the pickup mechanism, the pivotal bale shoe 72 pivots downwardly towards its normal horizontal position to await receipt of the next bale.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention and the limits of the appended claims.

I claim:

1. A bale loader mounted on an automatic bale wagon for picking up bales from the field and elevating them vertically onto the bale wagon, comprising in combination: a pivotally mounted, forwardly opening frame structure on said wagon; a pair of laterally spaced sidewalls mounted on said frame structure; a rear wall mounted on said frame structure and extending between said sidewalls; bale-elevating means vertically disposed in said rear wall for successively lifting bales from the ground and delivering them to said wagon; and a shoe comprised of a generally longitudinal extending planar portion revolvably mounted between its ends transversely to the upper-forward portion of said frame structure and pivotally moveable from a normally disposed horizontal position, said shoe being normally maintained in the horizontal position and spaced a predetermined distance forwardly of said elevating means such that as the entering portion of a bale tends to ride up with said elevating means, the rear portion of the shoe is engaged by the bale causing the entire shoe to be pivoted towards its vertical position, whereby the main body of the shoe engages the main body of the bale and urges the bale against the elevating means, thereby providing a positive force against the bale and facilitating the vertical elevating of the bale onto the bale wagon.

2. The bale loader set forth in claim 1 in which stop means are provided between the horizontal forward portion of the shoe and the forwardly opening frame structure to limit revolving movement of the shoe in one direction, the horizontal rear portion of the shoe being normally biased downwardly to force the stop means into limiting contact with the frame to normally maintain the shoe in a horizontal position.